United States Patent
Zhou et al.

(10) Patent No.: US 11,320,677 B2
(45) Date of Patent: May 3, 2022

(54) WAVELENGTH CALIBRATION METHOD, APPARATUS, AND SYSTEM FOR MICRORING FILTER

(71) Applicant: HUAWEI TECHNOLOGIES CO., LTD., Shenzhen (CN)

(72) Inventors: Sujie Zhou, Chengdu (CN); Long Luo, Dongguan (CN); Ruiqiang Ji, Dongguan (CN); Yanbo Li, Dongguan (CN); Mai Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/932,515

(22) Filed: Jul. 17, 2020

(65) Prior Publication Data

US 2020/0348543 A1 Nov. 5, 2020

Related U.S. Application Data

(63) Continuation of application No. PCT/CN2018/073242, filed on Jan. 18, 2018.

(51) Int. Cl.
*G02F 1/01* (2006.01)

(52) U.S. Cl.
CPC ............ *G02F 1/0147* (2013.01); *G02F 1/011* (2013.01); *G02F 1/0121* (2013.01); *G02F 2203/055* (2013.01)

(58) Field of Classification Search
CPC ...... G02F 1/0147; G02F 1/011; G02F 1/0121; G02F 2203/055
See application file for complete search history.

(56) References Cited

U.S. PATENT DOCUMENTS 7,680,364 B2    3/2010  Nilsson et al.
9,503,116 B2 *  11/2016 Speir ............... H03M 1/121
(Continued)

FOREIGN PATENT DOCUMENTS

CN    101035391 A    9/2007
CN    103411686 A    11/2013
(Continued)

OTHER PUBLICATIONS

Jayatilleka et al., Wavelength tuning and stabilization of microring-based filters using silicon in-resonator photoconductive heaters, Optics Express, V. 23, N. 19, 2015 (Year: 2015).*
(Continued)

*Primary Examiner* — Peter Radkowski
(74) *Attorney, Agent, or Firm* — Hauptman Ham, LLP

(57) ABSTRACT

A wavelength calibration method for a microring filter includes selecting N wavelengths from M wavelengths, and performing operations on the microring filter for each of the N wavelengths, thereby obtaining N sets of calibrated voltages, and obtaining, based on N sets of calibrated voltages, M−N sets of calibrated voltages corresponding to M−N wavelengths of the M wavelengths. The operating include adjusting thermal tuning power of the plurality of microrings in response to one set of voltages, and obtaining a plurality of sets of voltages that enable monitored optical power to have an extreme value, and using the plurality of sets of voltages as a reference, adjusting the thermal tuning power of the plurality of microrings in response to another set of voltages, and determining one of the N sets of calibrated voltages from the plurality of sets of voltages.

20 Claims, 5 Drawing Sheets

(56) References Cited

U.S. PATENT DOCUMENTS

| | | | |
|---|---|---|---|
| 10,009,135 B2* | 6/2018 | Tait | H04B 10/80 |
| 10,670,860 B2* | 6/2020 | Tait | G02B 27/0012 |
| 2007/0092177 A1 | 4/2007 | Nilsson et al. | |
| 2009/0161113 A1 | 6/2009 | Chen et al. | |
| 2016/0094017 A1 | 3/2016 | Larson | |
| 2016/0356959 A1* | 12/2016 | Jayatilleka | G02B 6/12007 |
| 2017/0045689 A1 | 2/2017 | Zhang et al. | |
| 2017/0302396 A1* | 10/2017 | Tait | H04B 10/275 |
| 2019/0331912 A1* | 10/2019 | Tait | G02B 27/0012 |
| 2020/0249472 A1* | 8/2020 | Tait | G02B 27/0012 |

FOREIGN PATENT DOCUMENTS

| | | | |
|---|---|---|---|
| CN | 104297854 A | | 1/2015 |
| CN | 105159080 A | | 12/2015 |
| CN | 106054317 A | | 10/2016 |
| CN | 107588932 A | | 1/2018 |
| CN | 111566530 B | | 2/2022 |
| EP | 3002836 A2 | | 4/2016 |
| JP | 2011108617 A | | 6/2011 |
| JP | 2017015789 A | | 1/2017 |

OTHER PUBLICATIONS

Jayatilleka et al., Automatic Tuning and Temperature Stabilization of High-Order Silicon Vernier Microring Filters, OFC, Th1G4.pdf, 2017 (Year: 2017).*

Jayatilleka et al., Automatic Configuration and Wavelength Locking of Coupled Silicon Ring Resonators, Journal of Lightwave Technology, vol. 36, No. 2, Jan. 15, 2018 (Year: 2018).*

Tait et al., Multi-channel control for microring weight banks, Optics Express, V. 24, N. 8, 2016 (Year: 2016).*

Tait et al., Microring Weight Banks, IEEE Journal of Selected Topics in Quantum Electronics, vol. 22, No. 6, Nov./Dec. 2016 (Year: 2016).*

Tait et al., Silicon microring weight banks for multivariate RF photonics, OSA, CLEO, SM1O.6.pdf. 2017 (Year: 2017).*

Tait et al., Neuromorphic photonic networks using silicon photonic weight banks, Scientific Reports | 7: 7430 | DOI: 10.1038/s41598-017-07754-z, 2017 (Year: 2017).*

Wu Danning et al: Research on Tunable Filter Based on Micro-Ring Resonators, 2016, total 7 pages.

Jason C. C. Mak, et al: "Automated Calibration of High-Order Microring Filters", 2015, total 2 pages.

Douglas Aguiar et al: Report on the TOADM design including locking and tuning, 2016, total 29 pages.

International Search Report issued in corresponding International Application No. PCT/CN2018/073242, dated Oct. 15, 2018, State Intellectual Property Office of the P.R. China, Beijing, China.

Slavicek et al., Karel, "CzechLight family of optical networking equipment", LFNM*2010 International Conference on Laser and Fiber-Optical Networks Modeling, Sep. 12-14, 2010, Sevastopol, Ukraine, total 5 pages.

European Search Report issued in corresponding European Patent Application No. 18901213.1, dated Nov. 17, 2020, pp. 1-9, European Patent Office, Munich, Germany.

Chinese Office Action issued in corresponding Chinese Office Action No. 201880085741.0, dated Dec. 29, 2020, pp. 1-3.

Chinese Search Report issued in corresponding Chinese Office Action No. 201880085741.0, dated Dec. 21, 2020, pp. 1-2.

European Office Action issued in corresponding European Application No. 18901213.1, dated Oct. 22, 2021, pp. 1-9, European Patent Office, Rijswijk, Netherlands.

Chinese Office Action issued in corresponding Chinese Application No. 201880085741.0, dated Jun. 28, 2021, pp. 1-9.

* cited by examiner

WAVELENGTH CALIBRATION METHOD, APPARATUS, AND SYSTEM FOR MICRORING FILTER

CROSS-REFERENCE TO RELAYED APPLICATIONS

This application is a continuation of International Patent Application No. PCT/CN2018/073242, filed on Jan. 18, 2018. The disclosure of the aforementioned application is hereby incorporated by reference in its entirety.

TECHNICAL FIELD

This application relates to the field of optical components, and in particular, to a wavelength calibration technology for a microring filter.

BACKGROUND

A microring filter has advantages such as low power consumption, a small size, and massive and easy integration. Therefore, the microring filter can meet requirements of large bandwidth, low power consumption, and high integration of an optical communications system, and is considered as a most promising basic optical component in a next-generation optical communications network.

The microring filter has different orders according to different quantities of microrings included in the microring filter. For example, a first-order filter includes one microring, and a third-order filter includes three microrings. More orders of a filter indicate better performance of the filter, but indicate more complex control for the filter. Control on the microring filter is mainly to apply a proper drive voltage or a proper drive current to a microring, so that the microring operates on a resonant wavelength. Operating wavelengths (namely, resonant wavelengths) on which a same microring filter is located are different, and therefore, corresponding required drive voltages are also different. A process of searching for proper drive voltages for the microring on all operating wavelengths is referred to as wavelength drive voltage calibration (or wavelength calibration for short).

In a current wavelength calibration method, when input of a microring filter is a determined wavelength, a drive voltage of one microring is adjusted by using one set of voltages, to determine a drive voltage that maximizes detected optical power (subsequently referred to as a maximum drive voltage) in the set of voltages. Afterwards, a voltage, being currently adjusted, of the microring is set to the previously obtained maximum drive voltage, and then same operations are performed on a next microring until it is determined that maximum drive voltages of all microrings are one set of calibrated voltages. To perform voltage calibration for all wavelengths, after an input wavelength of the microring filter is changed, repeat the foregoing steps. This wavelength calibration method is simple, but may result in comparatively high system power consumption during operation of the microring filter.

SUMMARY

Embodiments of this application provide a wavelength calibration method, apparatus, and system for a microring filter, so as to calibrate drive voltages of the microring filter on all operating wavelengths, to achieve an objective of reducing system power consumption of the microring filter.

According to a first aspect, an embodiment of this application provides an apparatus, configured for wavelength calibration for a microring filter. The apparatus includes a processor, an optical power detector, and a driver, where the optical power detector is configured to obtain monitored optical power of the microring filter and provide the monitored optical power to the processor;

the driver is configured to apply a drive voltage specified by the processor to a plurality of microrings of the microring filter; and the processor is configured to:

select N wavelengths from M wavelengths, and perform the following operations on the microring filter for each of the N wavelengths, to obtain N sets of calibrated voltages, where N is less than M:

A1: adjusting thermal tuning power of the plurality of microrings by using one set of voltages, and obtaining a plurality of sets of voltages that enable the monitored optical power to have an extreme value; and A2: using the plurality of sets of voltages as a reference, and adjusting the thermal tuning power of the plurality of microrings by using another set of voltages, and determining one of the sets of calibrated voltages from the plurality of sets of voltages, where the set of calibrated voltages enables the monitored optical power to converge; and obtain, through calculation based on the N sets of calibrated voltages, M–N sets of calibrated voltages corresponding to M–N wavelengths of the M wavelengths.

Depending on different detected ports, the extreme value may be a maximum value or a minimum value. To further ensure accuracy of a calibrated voltage, the set of calibrated voltages further needs to be capable of comparing corresponding monitored optical power with a preset threshold. Specifically, the monitored optical power is not less than a preset value when the monitored optical power has a maximum value, or the monitored optical power is not greater than another preset value when the monitored optical power has a minimum value.

In a possible design, the adjusting thermal tuning power of the plurality of microrings by using one set of voltages, and obtaining a plurality of sets of voltages that enable the monitored optical power to have an extreme value includes:

adjusting the thermal tuning power of the plurality of microrings by using the one set of voltages, and obtaining a plurality of sets of other voltages that enable the monitored optical power to have the extreme value, where each of the plurality of sets of other voltages corresponds to one of the plurality of microrings; and determining the plurality of sets of voltages based on the plurality of sets of other voltages, where each of the plurality of sets of voltages is constituted by taking one voltage value from each of the plurality of sets of other voltages for combination.

In a possible design, the obtaining a plurality of sets of other voltages that enable the monitored optical power to have the extreme value includes performing low-pass filtering processing on obtained voltages and a monitored power data pair, to reduce a quantity of obtained extreme voltages and increase calibration efficiency.

In a possible design, a voltage adjustment range in step A1 is greater than a voltage adjustment range in step A2. After a to-be-selected set of calibrated voltages is determined, a comparatively small voltage adjustment range is used when voltage commissioning is performed on microrings. In this way, a wavelength calibration speed can be increased without affecting calibration accuracy.

In a possible design, the N wavelengths are evenly distributed in the M wavelengths. In addition, N/M ranges from 0.1 to 0.2.

In a possible design, the processor is further configured to sort the plurality of sets of voltages in ascending order of values.

In a possible design, the obtaining, through calculation based on the N sets of calibrated voltages, M–N sets of calibrated voltages corresponding to M–N wavelengths of the M wavelengths includes:

obtaining, based on the N sets of calibrated voltages. M–N calibrated voltage values through calculation according to the following equation:

$$\lambda_2 - \lambda_1 = \frac{\eta(U_2^2 - U_1^2)}{2\pi R \cdot R_m} \cdot \frac{\lambda_m}{n_g},$$

where $\lambda_2 - \lambda_1$ represents a difference between two wavelengths, $$\frac{(U_2^2 - U_1^2)}{R_m}$$

represents a difference between detected optical powers corresponding to the two wavelengths, η represents a thereto-optical tuning proportion, R represents a radius of a microring, $R_m$ represents a resistance value of the microring. $\lambda_m$ represents value of a wavelength with a known calibrated voltage set in the two wavelengths, and $n_g$ represents a refractive index.

It should be noted that the foregoing description for a multi-order microring filter is also applicable to a single-order microring filter. A difference lies in that one set of calibrated voltages includes only one calibrated voltage value.

According to a second aspect, an embodiment of this application provides a wavelength calibration method, and the method is used to per form the steps according to the first aspect or any specific design of the first aspect. Similarly, the method is applicable to a single-order microring filter or a multi-order microring filter.

According to a third aspect, an embodiment of this application provides a computer storage medium, configured to store a computer software instruction used by the calibration apparatus according to the second aspect; and the computer storage medium includes the program mentioned in the second aspect or any design of the second aspect.

According to a fourth aspect, an embodiment of this application provides a computer program product, and when the computer program product is run on a computer, the computer is enabled to perform the method provided in the second aspect or any design in the second aspect.

According to a fifth aspect, an embodiment of this application provides a wavelength calibration system. The system includes the apparatus and the microring filter mentioned in the first aspect or any specific design of the first aspect.

By using a wavelength calibration technology provided in this application, a plurality sets of extreme voltages are obtained as candidate sets of calibrated voltages, and a set of voltages with smaller value is selected from the candidate sets of calibrated voltages as one set of calibrated voltages of a microring filter. In this way, the wavelength calibration technology disclosed in this application effectively reduces system power consumption of the microring filter. In addition, some wavelengths are selected for calibration, and calibrated voltages of remaining wavelengths are obtained through calculation. This greatly increases calibration efficiency.

BRIEF DESCRIPTION OF DRAWINGS

The following describes in further details the embodiments of this application with reference to the accompanying drawings.

DESCRIPTION OF EMBODIMENTS

A network architecture and a service scenario described in the embodiments of this application are intended to more clearly describe the technical solutions in the embodiments of this application, and do not constitute a limitation on the technical solutions provided in the embodiments of this application. A person of ordinary skill in the art may learn that the technical solutions provided in the embodiments of this application are also applicable to a similar technical problem as the network architecture evolves and a new service scenario emerges.

General Overview:

A microring filter can selectively output an input optical signal by using characteristics that an annular waveguide is sensitive to an input wavelength. For example, one of a plurality of input wavelength signals may be filtered out, and output from one drop port, and another wavelength signal may be output from an output port after being multiplexed with a signal that has a same wavelength as the filtered-out wavelength signal and that is added from another port. The microring filter plays a very basic role in an optical network. Specifically, the optical network may be a wavelength division multiplexing (Wavelength Division Multiplexing, WDM) transmission system, an optical time division multiplexing (Optical Time Division Multiplexing, OTDM) system, an all-optical switching system, or the like. The microring filter is a basic functional unit of many optical functional components or devices. For example, a tunable optical add/drop multiplexer (Tunable Optical Add/Drop Multiplexer, TOADM) (or referred to as a reconfigurable optical add/drop multiplexer (Reconfigurable Optical Add/Drop Multiplexer, ROADM)), an optical switch (Optical Switch), a multiplexer, and a demultiplexer all may use the microring filter. A specific scenario in which the microring filter is used and a specific device form are not limited in this application.

Figure 1:
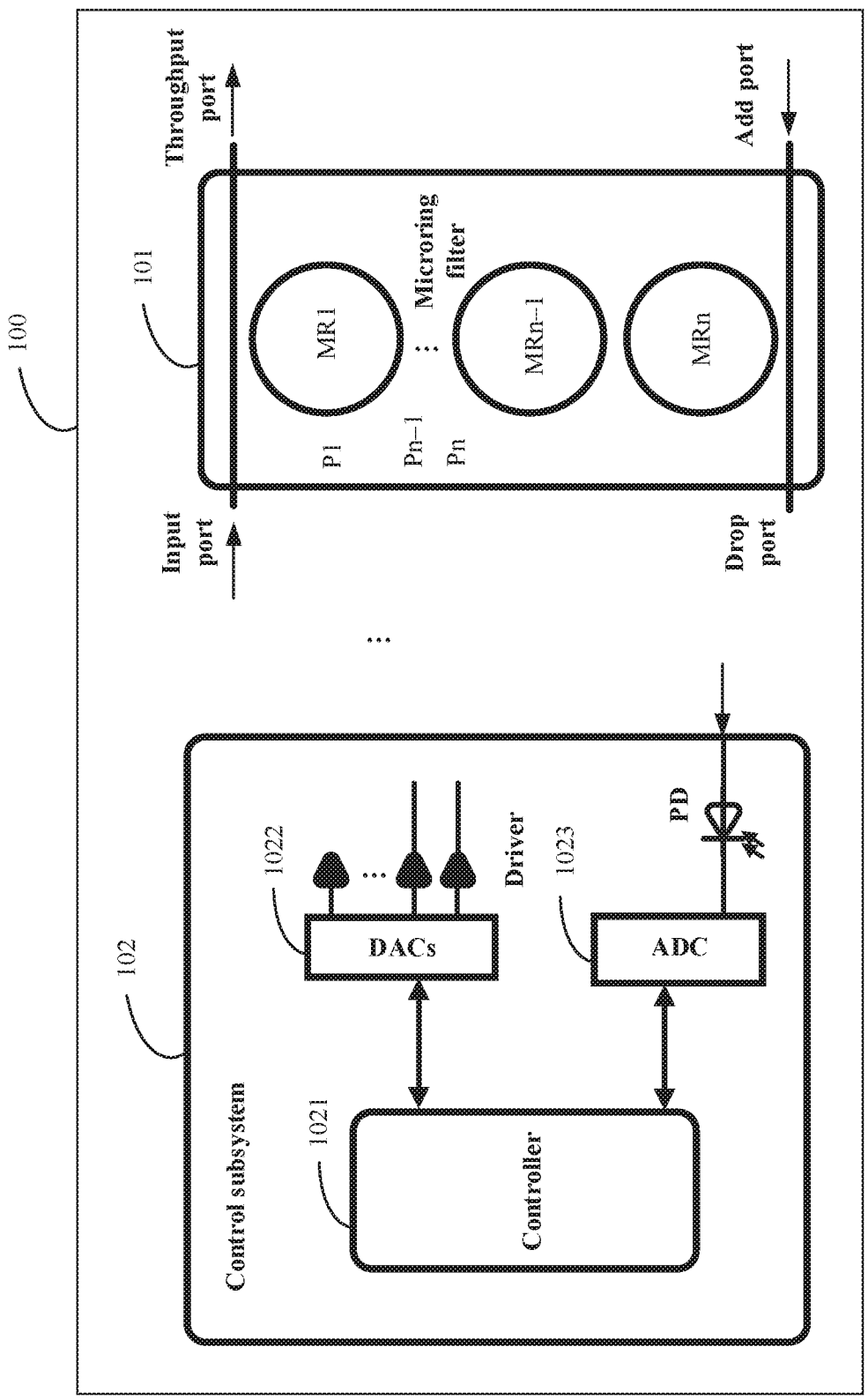
FIG. 1 is a possible structural diagram of hardware of a wavelength calibration system according to this application.

FIG. 1 is a possible structural diagram of hardware of a wavelength calibration system 100 according to this application. Specifically, the wavelength calibration system 100 includes two parts: a microring filter 101 and a control subsystem 102. The microring filter 101 includes one or more microring waveguides (Microring, MR), that is, MR1, . . . , MRn−1, and MRn. When n=1, it indicates that the microring filter has only one microring. In addition, the filter further includes a straight through waveguide and a plurality of ports. The plurality of ports include an input (INPUT) port, a throughput (THROUGHPUT) port, an add (ADD) port, a drop (DROP) port, and one set of power control ports (P1, . . . , Pn−1, and Pn). The set of power control ports is configured to perform voltage control on a corresponding microring, so that the microring can operate on an ideal resonant wavelength. It should be noted that a quantity of the set of power control ports is generally equal to a quantity of microrings. To be specific, microring filters with different orders have different quantifies of power control ports, and a quantity of power control ports is generally the same as a quantity of orders. Optionally, the microring filter may further include some monitoring ports configured to monitor optical power of a microring. Alternatively, if there is no monitoring port, optical power may be monitored by using another existing port. For example, the drop port or the throughput port may be used to monitor the optical power. When the microring filter or another functional apparatus including the microring filter is used, one or more wavelengths are input through an input port, and output ports corresponding to these wavelengths depend on a specific setting. A person skilled in the art may learn that a resonant wavelength of the microring is controlled by using different drive voltages, so that an output port of an input wavelength can be changed. Details are not described in this application.

The other part included in the wavelength calibration system 100 is the control subsystem 102, and the control subsystem 102 is also referred to as a wavelength calibration apparatus, and is configured to calibrate drive voltages that should correspond to different resonant wavelengths of the microring filter. Specifically, the control subsystem mainly includes a controller 1021, a digital-to-analog converter (Digital-to-analog Converter, DAC) 1022, an analog-to-digital converter (Analog-to-digital Converter, ADC) 1023, a PD (photodiode, unnumbered in the figure), and a driver (unnumbered in the figure). A connection relationship of these components is shown in FIG. 1. Specifically, the controller 1021 is connected to both the DAC 1022 and the ADC 1023 through interfaces. The DAC 1022 is configured to convert wavelength control information of the controller into a corresponding instruction (for example, a power control signal, a drive voltage, or a drive current), and then send the instruction to the microring filter 101 after the instruction is amplified by the driver. The ADC 1023 is configured to convert the monitored optical power of the microring filter into a digital signal, and then send the digital signal to the controller 1021. Specifically, the control subsystem 102 is connected to a monitored output port or another port of the microring filter by using one or more fibers, and converts the obtained monitored optical power into a current by using the PD, and then the ADC 1023 converts the current to provide a current to the controller 1021. It should be noted that the example shown in FIG. 1 includes only one ADC and one PD. However, specific quantities of ADCs and PDs are not limited in this application. A wavelength calibration technology disclosed in this application may be applied to a scenario in which a plurality of monitored optical power are obtained. Specifically, a port corresponding to the PD of the control subsystem 102 and a port connected to the microring filter 101 may be throughput ports, drop ports, or monitoring ports. Refer to the following method embodiments for details, and details are not described herein. For another example, one monitoring port may be disposed for each microring of the microring filter, and therefore, the corresponding control subsystem has a plurality of monitoring ports to be connected to the microring filter, so as to obtain a plurality of monitored optical power. It should be further noted that the port is also referred to as an interface. For brevity of description, the port and the interface are collectively referred to as ports in this application. In addition, it should be further noted that the PD in FIG. 1 is a general term. For example, the RD may be of a PIN type or a PN type. This is not limited in this application. The controller 1021 may be implemented by using a field programmable gate array (FPGA), an FPGA and a processor, or an FPGA and an application specific integrated circuit (ASIC). Specifically, refer to specific description of the apparatus embodiment, and details are not described herein.

It should be further noted that the microring filter can operate on a resonant wavelength or near a resonant wavelength by using a calibrated drive voltage (that is, an initial drive voltage). However, because an external environment in which a microring is located, for example, a wavelength and a temperature of an input optical signal of the microring, constantly changes, the microring may deviate from a target resonant wavelength. Therefore, the control subsystem needs to use a locking algorithm to fine-tune the drive voltage, to ensure that an optical switch continuously operates on the resonant wavelength. The technology provided in this application is mainly used to determine the initial drive voltage of the microring filter, to be specific, provide a calibrated voltage. Generally, the microring filter needs to be able to provide drive voltages for a plurality of wavelengths. Therefore, a drive voltage of the microring needs to be provided for each wavelength. To simplify a description, in the following in this application, a process of finding proper drive voltages on all operating wavelengths for one or more microrings of one microring filter is referred to as wavelength calibration.

The following describes the wavelength calibration technology described in this application with reference to more accompanying drawings.

Figure 2:
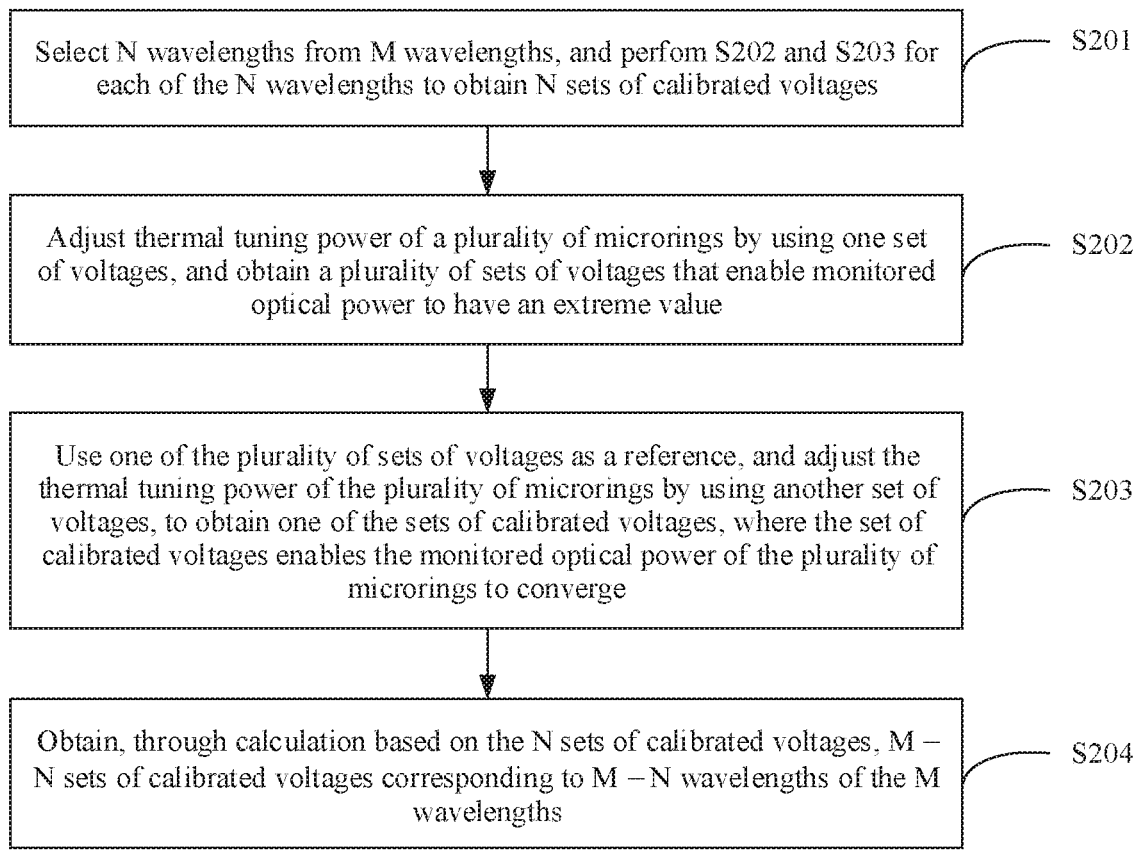
FIG. 2 is a schematic flowchart of a wavelength calibration method according to this application.

FIG. 2 is a schematic flowchart of a wavelength calibration method according to this application. It should be noted that the method may be applied to a microring filter with any order.

In an S201 part, N wavelengths are selected from M wavelengths, and S202 and S203 are performed for each of the N wavelengths to obtain N sets of calibrated voltages.

A quantity of wavelengths supported by a microring filter varies for different wavelength division systems. For example, the quantity of wavelengths may be 40 or 80. A specific total quantity of wavelengths is not limited in this application. Specifically, in this step, a small quantity of wavelengths are selected from the total quantity of wavelengths supported by the microring filter to perform the following two steps, that is, S202 and S203. For example, if the microring filter or an optical network apparatus using the microring filter supports 80 wavelengths, 8 to 10 of the 80 wavelengths may be selected to determine calibrated voltages through drive voltage adjustment and optical power detection. Generally, 10% to 20% of the total quantity of wavelengths can be selected. A purpose of selecting 10% to 20% of the total quantity of wavelengths is to quickly obtain, by performing step S204 by using a few of calibrated voltages obtained through commission, a calibrated voltage of another wavelength that is not commissioned. In this way, a wavelength calibration speed can be greatly increased. However, a specific selection proportion is not limited in this application. In this step, the so-called "for each of the N wavelengths" refers to sending an optical signal having a specified wavelength to an input port of the microring filter shown in FIG. 1 by using a laser capable of generating a single wavelength or another optical component capable of generating a single wavelength. Then, steps S202 and S203 are performed to obtain a calibrated drive voltage of a corresponding microring on the wavelength.

It should be noted that explanation of the following two steps is described for one wavelength. In an entire wavelength calibration process, the following two steps need to be performed once for each wavelength. In addition, if the microring filter includes only one microring, only one calibrated voltage value exists in the obtained N sets of calibrated voltages.

In an S202 part, thermal tuning power of a plurality of microrings is adjusted by using one set of voltages, and a plurality of sets of voltages that enable monitored optical power to have an extreme value are obtained.

Specifically, in a voltage range, a comparatively small step is used to perform voltage scanning on the microrings included in the microring filter one by one, and then, the plurality of sets of voltages are finally obtained, in combination with the monitored optical power, for use in a next step. For example, four microrings are used as an example, the four microrings may be adjusted in turn by using 0.1 V as a step unit within a range of 0 V to 5 V (V). To simplify a description, in this application, a process of adjusting the microrings by using the set of voltages is sometimes referred to as microring voltage scanning. For example, the control subsystem in FIG. 1 may use one set of voltages {0.1 V, 0.2 V, . . . , and 5 V}, and these voltages are applied to an MR1 in turn through a power control port, and each applied voltage and monitored optical power corresponding to the applied voltage are recorded. Similarly, corresponding voltage control may be performed on an MR2, . . . , an MRn–1, and an MRn, and each applied voltage and monitored optical power corresponding to the applied voltage are recorded. Different detected ports perform different processing of obtaining a plurality of sets of applied voltages and monitored optical power. An example in which the drop port shown in FIG. 1 is used to detect optical power is used, a voltage (also referred to as an extreme voltage in the following) that is in each microring and that enables the monitored optical power to be a maximum value needs to be obtained and recorded. The four microrings are still used as an example. It is assumed that there are two voltage values that enable the monitored optical power of the MR1 to have the maximum value, which is {1.1 V and 2.3 V}. Similarly, sets of voltages obtained for the MR2, an MR3, and an MR4 are {2.1 V and 2.9 V}, {1.7 V and 2.1 V}, and {1.9 V and 2.7 V}, respectively. In this case, the four sets of voltage values need to be combined to obtain the plurality of sets of voltages that enable the monitored optical power to have the maximum value, as described in the S202 part. Specifically, the set of voltages is constituted by taking a value from one set of extreme voltages corresponding to each microring for combination. For example, in the foregoing example of the four microrings, one value is selected from one set of voltages corresponding to each microring, and a plurality of sets of voltages may be obtained for use in a next step. For example, {1.1 V, 2.1 V, 1.7 V, and 1.9 V} may be obtained by taking the first extreme voltage of each microring, and {2.3 V, 2.9 V, 2.1 V, and 2.7 V} may be obtained by taking the second extreme voltage of each microring. It should be noted that, a quantity of a plurality of finally obtained sets of voltages depends on a quantity of extreme voltages of each microring. An example in which a quantity of extreme voltages of the four microrings are Q1, Q2, Q3, and Q4 respectively is used, and the quantity of the plurality of finally obtained sets of voltages is Q1×Q2×Q3×Q4.

It should be noted that, when one of the microrings is commissioned in this step, a drive voltage of another microring may have any preset value. For example, the drive voltage is set to an initial value 0 V.

Optionally, before an extreme voltage is determined, obtained data of a single microring may be processed to remove a pseudo value. For example, the data may be processed through low-pass filtering. It should be noted that the so-called pseudo value is a voltage value that theoretically does not enable the monitored power to be an extreme value, but enables the monitored optical power to be an extreme value in actual measurement. Generally, the pseudo value is caused due to circuit noise. An advantage of the processing obtained data of a single microring is to make obtained voltage-power curve smoother, and improve accuracy of subsequent extreme voltage selection.

Optionally, if a quantity of extreme voltages for one microring is too large, the quantity of extreme voltages may be reduced by setting a threshold of the quantity of extreme voltages, by setting a threshold of monitored power, or in a manner of a combination of the two. For example, the quantity of extreme voltages may be set to 3. If a quantity of extreme voltages for a single microring is less than or equal to 3, removal processing is not required. If a quantity of extreme voltages for a single microring is greater than 3, it may be determined whether monitored power corresponding to each extreme voltage is greater than a threshold, and only if the monitored power corresponding to each extreme voltage is greater than the threshold, the extreme voltage corresponding to the power is considered to be valid.

Optionally, to increase processing efficiency of step S203, the plurality of obtained sets of voltages may be sorted, so that one set of voltages with smaller values is first processed in step S203. In this way, efficiency of obtaining one set of calibrated voltages can be increased. For example, the plurality of obtained sets of voltages is sorted in ascending order of values. To be specific, in the ranked plurality of sets of voltages, a voltage value included in the first set of voltages is a minimum extreme voltage corresponding to each microring, and one of voltage values included in the second set is a second minimum extreme voltage of the microring, the other values are still minimum extreme voltages a corresponding microring, and so on. The ranking step may also be executed in step S203.

It should be noted that the foregoing description is made by using the extreme value as a maximum value, that is, the extreme voltage is a maximum voltage. Optionally, the throughput port shown in FIG. 1 may also be used to detect optical power. Then, a minimum voltage needs to be determined. Therefore, if a threshold needs to be set to limit the quantity of extreme voltages, whether obtained monitored optical power is less than the threshold needs to be determined. Corresponding minimum optical power is considered to be valid only when the obtained monitored optical power is less than the threshold. In addition, if each microring is monitored, the obtained monitored optical power also has a maximum value. Description of a processing method is similar to that of the drop port.

In an S203 part, one of the plurality of sets of voltages is used as a reference, and the thermal tuning power of the plurality of microrings is adjusted by using another set of voltages, to obtain one of the sets of calibrated voltages, where the set of calibrated voltages enables the monitored optical power of the plurality of microrings to converge.

Specifically, the one set of voltages is selected as a reference according to a specific sequence from the plurality of sets of voltages obtained in S202, and then voltages applied to the plurality of microrings are changed in turn by using the another set of voltage values. It should be noted that the set of voltages is used as a reference means that for a corresponding microring, a range of the another set of voltage values needs to include a corresponding extreme voltage in the set of voltages. The first set of voltages determined by selecting values from sets of voltages corresponding to the foregoing four microrings is used as an example, that is, {1.1 V, 2.1 V, 1.7 V, and 1.9 V}, another set of voltages for a first microring may be 1.1 V±0.5 V used as a voltage adjustment range (that is, the adjustment range is ±0.5 V), and power adjustment is performed on the first microring by using a granularity of 0.1 V or another step. Optionally, a range of the another set of voltages may be consistent with the voltage adjustment range selected in step S202, for example, a range of 0 V to 5 V. If a smaller range is selected, wavelength calibration time can be shortened. The plurality of microrings are scanned once or are scanned sequentially and repeatedly, to determine whether a currently selected set of voltages is one set of calibrated voltages. Specifically, if the obtained monitored optical power converges after the plurality of microrings are scanned repeatedly and sequentially, it is determined that correspondingly used set of voltages is the set of calibrated voltages. More times indicate higher reliability but longer time consumption. Generally, a quantity of repetitions may be about 3 to 5. However, a specific quantity of repetitions is not limited in this application. The quantity of repetitions may be 1. To be specific, each microring is scanned only once. To improve accuracy, a plurality of times of voltage scanning may alternatively be performed for one microring, for example, 3 to 5. That the monitored optical power converges means that a value change of monitored optical power obtained by adjusting a same microring is within a specific range. For example, a fluctuation range of an obtained power value is ±0.1 mW to 0.5 mW (mW).

The specific sequence mentioned above may be a sequence of sorting in ascending order of voltage values, as described in S202. If sorting in ascending order has been completed in the previous step, the set of calibrated voltages is obtained and this step is performed in turn. Optionally, in this step, the plurality of obtained sets of voltages may be further divided into a plurality of sets, and one set of voltages is selected from the plurality of sets of voltages in ascending order, descending order, or random order. An order of selecting one of the plurality of sets of voltages is not limited in this application.

Optionally, the monitored optical power may be further limited. To be specific, it may be limited that the monitored optical power converges and is not less than a preset threshold (also referred to as a threshold), and only a corresponding set of voltages that meets this condition is determined as one set of calibrated voltages. It should be noted that the foregoing description for this step is targeted for the maximum voltage. For the minimum voltage, similar to that in S202, a limitation on the monitored optical power is that the monitored optical power is not greater than a preset threshold. It should be noted that, selection of the threshold needs to be determined based on a specific parameter of an actual to-be-calibrated microring filter, for example, intensity of an incident optical signal or circuit noise. How to set the threshold is not limited in this application.

In an S204 part, based on the N sets of calibrated voltages, M−N sets of calibrated voltages corresponding to M−N wavelengths of the M wavelengths are obtained through calculation.

According to a linear relationship between a resonant wavelength of a microring and power loaded on the microring, in the current step, a calibrated voltage corresponding to another wavelength that is not commissioned is obtained through calculation based on the obtained N sets of calibrated voltages. It should be noted that, in this application, a voltage, a current, or the power loaded on the microring refers to heat energy provided for the microring. Unless otherwise specified, in all the embodiments provided in this application, the voltage is used as an example. A person skilled in the art may directly change, according to a mathematical relationship among the voltage, the current, and the power, the voltage in the embodiments provided in this application to the current or the power for use. These simple variation uses should fall within the protection scope of this application.

Specifically, a relationship between the resonant wavelength of the microring and the power of the microring is represented by the following mathematical relation:

$$\Delta\lambda = \frac{\eta \Delta P}{2\pi R} \cdot \frac{\lambda_m}{n_g},$$

where $\Delta\lambda$ represents a difference between two wavelengths, $\Delta P$ represents a power difference applied by the two wavelengths, $\eta$ represents a thermo-optical tuning proportion, R represents a radius of a microring, $\lambda_m$ represents value of a wavelength with known calibrated voltage information in the two wavelengths, and $n_g$ represents a refractive index.

According to a relationship between the power and the voltage, the foregoing formula may further be expressed as:

$$\lambda_2 - \lambda_1 = \frac{\eta(U_2^2 - U_1^2)}{2\pi R \cdot R_m} \cdot \frac{\lambda_m}{n_g},$$

where $R_m$ represents a resistance value of the microring. Specifically, for a microring, a calibrated voltage corresponding to a to-be-calculated wavelength may be obtained by using a calibrated voltage value, a wavelength corresponding to the voltage value, detected optical power information, and to-be-calculated wavelength information.

The following provides a specific example. It is assumed that, for a microring (a corresponding resistor is R1) of the microring filter, a calibrated voltage on $\lambda_1$ $U_1$, corresponding monitored optical power is $P_1$, and the to-be-calculated wavelength is $\lambda_2$, where $\lambda_2 > \lambda_1$. First, $\Delta\lambda$ may be obtained by subtracting $\lambda_1$ from $\lambda_2$. Then, a value of $\Delta P$ is obtained according to the foregoing formula. $\Delta P$ is a difference between corresponding monitored optical powers of the microring on the two wavelengths. According to $P=U^2/R$, and the known $U_1$ and the known $P_1$, a value of $U_2$ may be obtained, that is, a calibrated voltage on $\lambda_2$ is obtained. Similarly, one set of calibrated voltages corresponding to the M−N wavelengths that are not commissioned may be obtained through calculation according to the foregoing mathematical relationship. It should be noted that $\Delta\lambda$ is a positive number, and is obtained by subtracting a smaller wavelength from a larger wavelength of the two wavelengths. In addition, if the to-be-calculated wavelength is less than a wavelength on which a voltage has been calibrated, a calibrated voltage is calculated by subtracting the to-be-calculated wavelength from a calibrated wavelength.

It should be noted that, when one to-be-calibrated wavelength is calculated, a calibrated wavelength voltage and calibrated optical power information that are close to the wavelength may be selected. Alternatively, a plurality of pieces of calibrated wavelength information may be selected, calibrated voltages of the to-be-calculated wavelength are obtained through calculation for a plurality of times, to obtain an average value. How to calculate a calibrated voltage for a calibrated wavelength is not limited in this application.

A plurality of sets of extreme voltages are obtained as candidate sets of calibrated voltages, and a smaller set is selected from the candidate sets of calibrated voltages as one set of calibrated voltages of a microring filter. In this way, the wavelength calibration technology disclosed in this application effectively reduces a system power loss of the microring filter. Compared with that in the prior art, values of the set of calibrated voltages of the microring filter are comparatively small. This helps to ensure that interference during adjustment between different wavelengths is reduced, and therefore, and therefore, tolerance of the microring to an environment change can be improved. In addition, some wavelengths are selected for calibration, and calibrated voltages of remaining wavelengths are obtained through calculation. This greatly increases a calibration speed and increases calibration efficiency.

It should be noted that, in this application, microring voltage scanning for a multi-order microring filter may be performed in any order, for example, an order from the MR1, the MR2, the MR3, to the MRn shown in FIG. 1. For simplify a description, in the embodiments of this application, the microring voltage scanning for a multi-order microring filter is performed in this order. However, how to determine a microring voltage scanning order in specific application is not limited in this application.

The following further describes the embodiments of this application in detail based on the foregoing common aspects of a wavelength calibration technology mentioned in this application. It should be noted that the terms "first", "second", and the like in the following embodiments of this application are used to distinguish similar objects, and do not need to be used to describe a specific sequence or a sequence. It should be understood that data used in such a way is interchangeable in a proper circumstance, so that the embodiments described herein can be implemented in other sequences other than what is illustrated or described herein. It should be further noted that, unless otherwise specified, a specific description for some technical features in one embodiment may further be used to explain corresponding technical features mentioned in other embodiments.

Embodiment 1

This embodiment provides a wavelength calibration method, apparatus, and system. An example in which the system includes the control subsystem and a third-order microring filter shown in FIG. 1 is used. The wavelength calibration method is performed by the control subsystem, and wavelength calibration is completed by interacting with the third-order microring filter. It should be noted that, in this embodiment, an example in which the control subsystem obtains monitored optical power through a drop port of the microring filter is used.

Figure 3:
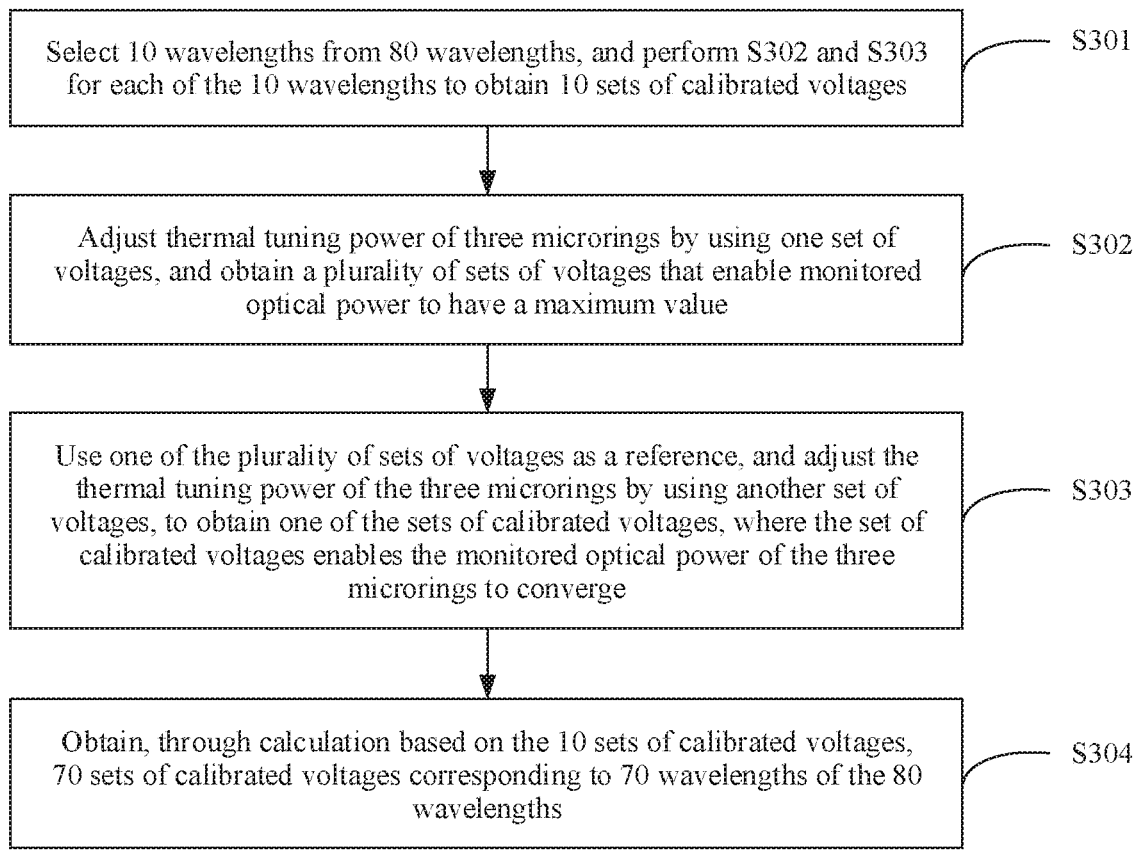
FIG. 3 is a schematic flowchart of a wavelength calibration method for a third-order microring filter according to this application.

FIG. 3 provides detailed steps, and the following steps are specifically included.

In an S301 part, 10 wavelengths are selected from 80 wavelengths, and S302 and S303 are performed for each of the 10 wavelengths to obtain 10 sets of calibrated voltages.

This part is a specific example of the S201 part. Refer to the description of the S201 part for details, and details are not described herein. In short, this part is used to determine one set of wavelengths on which calibrated voltages need to be obtained through commissioning. For example, if the microring filter supports $\lambda_1, \lambda_2, \ldots,$ and $\lambda_{80}, \lambda_1, \lambda_9, \lambda_{17}, \lambda_{25}, \lambda_{33}, \lambda_{41}, \lambda_{49}, \lambda_{57}, \lambda_{63},$ and $\lambda_{71}$ may be selected.

In an S302 part, thermal tuning power of three microrings is adjusted by using one set of voltages, and a plurality of sets of voltages that enable the monitored optical power to have a maximum value are obtained.

This part is a specific example of the S202 part. Refer to the description of the S202 part for details, and details are not described herein. The following briefly describes operations on the three microrings in this step. It is assumed that an input wavelength of a current microring filter is $\lambda_1$. An example in which a range of one set of voltages is 0 V to 5 V, and a step is 0.1 V is used, to be specific, this set of voltages is {0.1 V, 0.2 V, ..., and 5 V}. By applying specific values of the set of voltages to a microring 1, a microring 2, and a microring 3 in turn, three sets of voltages that enable the monitored optical power to have the maximum value may be obtained. Each set of voltages corresponds to one microring. Then, values of the three sets of voltages are combined to obtain a final required set of voltages. Each value in the finally required set of voltages corresponds to one microring, and a quantity of voltage values included in the set of voltages is equal to a quantity of microrings. For example, if obtained sets of voltages corresponding to the three microrings are {1.5 V and 2.5 V}, {1.9 V and 2.9 V}, and {1.1 V and 3.1 V}, eight sets of voltages are finally required, and after being sorted in ascending order, the eight sets of voltages are as follows: {1.5 V, 1.9 V, and 1.1 V}, {2.5 V, 1.9 V, and 1.1 V}, {1.5 V, 2.9 V, and 1.1 V}, {1.5 V, 1.9 V, and 3.1 V}, {2.5 V, 2.9 V, and 1.1 V}, {2.5 V, 1.9 V and 3.1 V}, {2.5 V, 2.9 V, and 1.1 V}, and {2.5 V, 2.9 V, and 3.1 V}. The eight sets of voltages are to be used in a next step.

It should be noted that, if an obtained set of voltages of a microring includes many voltage values, the voltage values may be screened by using the method described in step S202, for example, determining whether monitored optical power corresponding to the obtained set of voltages is greater than a preset threshold. Details are not described herein. It should be further noted that operations performed in this step and operations performed for different wavelengths in the next step are similar.

In an S303 part, one of the plurality of sets of voltages is used as a reference, and the thermal tuning power of the three microrings is adjusted by using another set of voltages, to obtain one of the sets of calibrated voltages, where the set of calibrated voltages enables the monitored optical power of the three microrings to converge.

This part is a specific example of the S203 part. Refer to the description of the S203 part for details, and details are not described herein. The following briefly describes a specific processing process for the three microrings. First, the first set of voltages {1.5 V, 1.9 V, and 1.1 V} is selected from the sorted sets of voltages obtained in step S302. Then, voltage scanning is performed on a corresponding microring by using each voltage in the set of voltages as a reference and by using a specific voltage range and a specific step. For example, if the voltage range is ±1 V. and the step is 0.2 V, the another set of voltages is {0.5 V, 0.7 V, . . . , and 2.5 V}. The set of voltages is applied to a first microring and corresponding monitored optical power is recorded. Then, similar operations are performed on other microrings. Then, it is determined whether monitored optical power obtained for each microring converges, if each monitored optical power converges, a currently used set of voltages is determined as a set of calibrated voltages. If each monitored optical power does not converge, a next set of voltages is selected, and same operations are performed until the set of calibrated voltages is finally obtained. Then, this step ends.

It should be noted that, for a specific order of selecting one set of voltages, another manner mentioned in the S203 part may alternatively be used. In addition, for a microring, a method for a plurality of times of repeated scanning may alternatively be used to reduce a probability of selecting an incorrect set of voltages.

In an S304 part, based on the 10 sets of calibrated voltages, 70 sets of calibrated voltages corresponding to 70 wavelengths of the 80 wavelengths are obtained through calculation.

This part is a specific example of the S204 part. Refer to the description of the S204 part for details, and details are not described herein. Specifically, calculation may be performed by using an obtained set of calibrated voltages and a corresponding wavelength and by using the calculation method described in the S204 part.

It should be noted that one set of voltage values used in different embodiments of this application may use one set of values that have a typical rule, for example, linear increase, linear decrease, non-linear increase, or non-linear decrease mentioned in Embodiment 1. How to specifically select the set of voltage values is not limited in this application.

For steps S302 and S303, the following table provides an example of wavelength calibration steps for the third-order microring filter. In the following example, it is assumed that the monitored power has a maximum value, and it is assumed that whether the monitored optical power converges and whether the monitored optical power is greater than a threshold need to be determined.

Step 1: Scan a first microring MR1 by using one set of voltages and record a voltage $\{V_{MR1}\}$ corresponding to maximum power.
Step 2: Scan a second microring MR2 by using the set of voltages and record a voltage $\{V_{MR2}\}$ corresponding to the maximum power.
Step 3: Scan a third microring MR3 by using the set of voltages and record a voltage $\{V_{MR3}\}$ corresponding to the maximum power
Step 4: Select one voltage from each of $\{V_{MR1}\}$, $\{V_{MR2}\}$, and $\{V_{MR3}\}$ to constitute a new set of voltages as a reference.
Step 5: Scan power of the three microrings by using another set of voltages that use the new set of voltages as the reference, and record a maximum monitored optical power value and a voltage corresponding to the maximum monitored optical power value.
Step 6: Determine whether the obtained maximum monitored power value of the three microrings converges. If the obtained maximum monitored power value of the three microrings does not converge, perform step 4 to reselect one set of voltages. If the obtained maximum monitored power value of the three microrings converges, perform step 7.
Step 7: Determine whether the maximum monitored power value is greater than a preset threshold (threshold). If the maximum monitored power value is greater than the preset threshold, determine a new set of voltages currently used as a set of calibrated voltages. If the maximum monitored power value is not greater than the preset threshold, perform step 4 to select a new set of voltages.

It should be noted that the voltages used in the foregoing first three steps may be a same set of voltages. In addition, step 4 may need to be performed repeatedly, and values included in a set of voltages obtained each time when step 4 is performed are different.

A plurality of sets of extreme voltages are obtained as candidate sets of calibrated voltages, and one set of voltages with smaller values is selected from the candidate sets of calibrated voltages as one set of calibrated voltages of the microring filter. In this way, the wavelength calibration technology disclosed in this embodiment effectively reduces a system power loss of the microring filter. Compared with that in the prior art, values of the set of calibrated voltages of the microring filter are comparatively small. This helps to ensure that interference during adjustment between different wavelengths is reduced, and therefore, tolerance of the microring to an environment change can be improved. In addition, some wavelengths are selected for calibration, and calibrated voltages of remaining wavelengths are obtained through calculation. This greatly increases a calibration speed and increases calibration efficiency.

Embodiment 2

This embodiment provides a wavelength calibration method, apparatus, and system. An example in which the system includes the control subsystem and a second-order microring filter shown in FIG. 1 is used. The wavelength calibration method is performed by the control subsystem, and wavelength calibration is completed by interacting with the second-order microring filter. It should be noted that, a difference from Embodiment 1 lies in that, in this embodiment, an example in which the control subsystem obtains monitored optical power through a throughput port of the microring filter is used.

Figure 4:
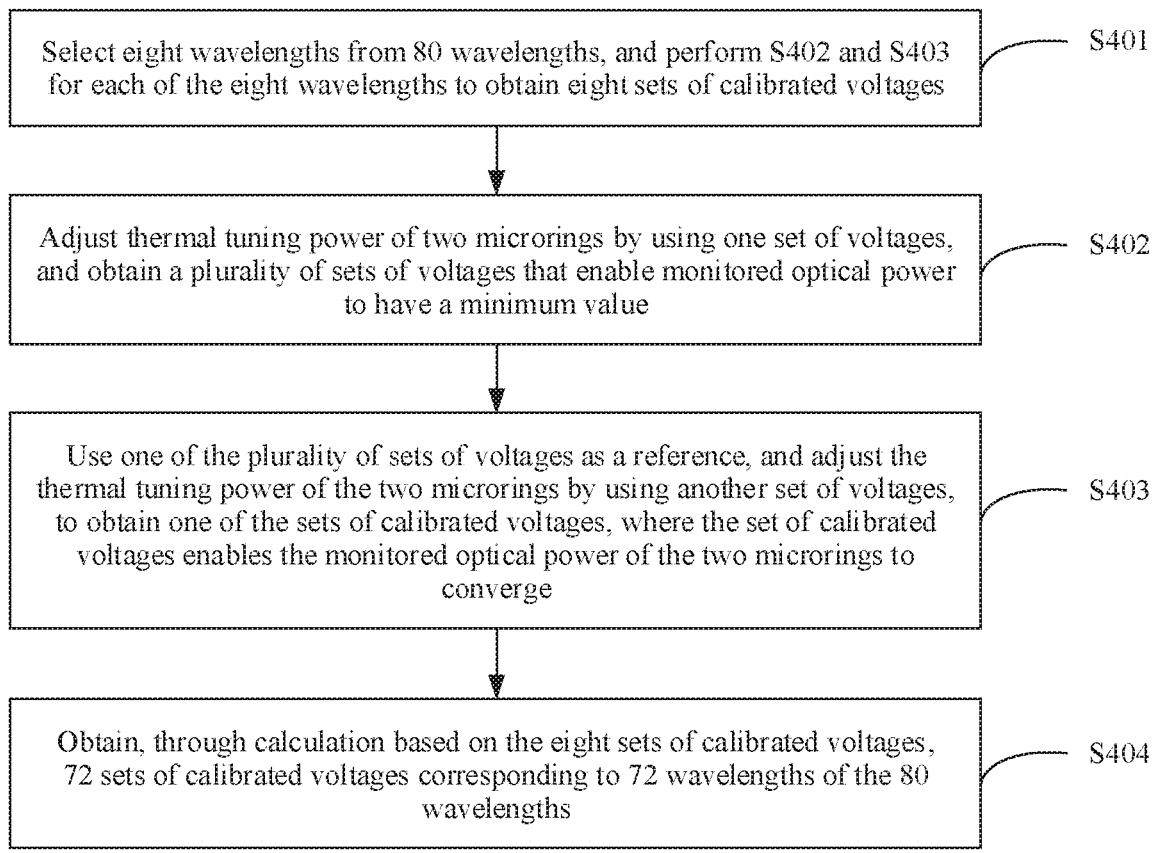
FIG. 4 is a schematic flowchart of another wavelength calibration method for a third-order microring filter according to this application.

FIG. 4 provides detailed steps, and the following steps are specifically included.

In an S401 part, eight wavelengths are selected from 80 wavelengths, and S402 and S403 are performed for each of the eight wavelengths to obtain eight sets of calibrated voltages.

This part is a specific example of the S201 part. Refer to the description of the S201 part for details, and details are not described herein. In short, this part is used to determine one set of wavelengths on which calibrated voltages need to be obtained through commissioning. For example, if the microring filter supports $\lambda_1, \lambda_2, \ldots,$ and $\lambda_{80}$, $\lambda_1, \lambda_{11}, \lambda_{21}, \lambda_{31}, \lambda_{41}, \lambda_{51}, \lambda_{61},$ and $\lambda_{71}$ may be selected.

It should be noted that the following two steps for different wavelengths are similar. Unless otherwise specified, in a related description, an example in which an input wavelength of the microring filter is a wavelength selected in this step is used.

In an S402 part, thermal tuning power of two microrings is adjusted by using one set of voltages, and a plurality of sets of voltages that enable the monitored optical power to have a minimum value are obtained.

This part is a specific example of the S202 part. Refer to the description of the S202 part for details, and details are not described herein. The following briefly describes operations on the two microrings in this step. An example in which a range of one set of voltages is 0 V to 5 V, and a step is 0.1 V, to be specific, this set of voltages is {0.1 V, 0.2 V, . . . , and 5 V}. By applying specific values of the set of voltages to a microring 1 and a microring 2 in turn, two sets of voltages that enable the monitored optical power to have the minimum value may be obtained. Each set of voltages corresponds to one microring. Then, values of the two sets of voltages are combined to obtain a final required set of voltages. Each value in the finally required set of voltages corresponds to one microring, and a quantity of voltage values included in the set of voltages is equal to a quantity of microrings. For example, if obtained sets of voltages corresponding to the two microrings are {1.5 V and 2.5 V} and {1.9 V and 2.9 V}, four sets of voltages are finally required, and after being sorted in ascending order, the four sets of voltages are as follows: {1.5 V and 1.9 V}, {2.5 V and 1.9 V}, {1.5 V and 2.9 V}, and {2.5 V and 1.9 V}. The four sets of voltages to be used in a next step.

It should be noted that, if an obtained set of voltages of a microring includes many voltage values, the voltage values may be screened by using the method described in step S202, for example, determining whether monitored optical power corresponding to the obtained set of voltages is less than a preset threshold. Details are not described herein.

In an S403 part, one of the plurality of sets of voltages is used as a reference, and the thermal tuning power of the two microrings is adjusted by using another set of voltages, to obtain one of the sets of calibrated voltages, where the set of calibrated voltages enables the monitored optical power of the two microrings to converge.

This part is a specific example of the S203 part. Refer to the description of the S203 part for details, and details are not described herein. The following briefly describes a specific processing process for the two microrings. First, the first set of voltages {1.5 V and 1.9 V} is selected from the sorted sets of voltages obtained in step S402. Then, voltage scanning is performed on a corresponding microring by using each voltage in the set of voltages as a reference and by using a specific voltage range and a specific step. For example, if the voltage range is ±1 V, and the step is 0.1 V, the another set of voltages is {0.5 V, 0.6 V, . . . , and 2.5 V}. The set of voltages is applied to a first microring and corresponding monitored optical power is recorded. Then, similar operations are performed on other microrings. Then, it is determined whether monitored optical power obtained for each microring converges. If each monitored optical power converges, a currently used set of voltages is determined as a calibrated voltage. If each monitored optical power does not converge, a next set of voltages is selected, and same operations are performed until the set of calibrated voltages is finally obtained. Then, this step ends.

It should be noted that, for a specific order of selecting one set of voltages, another manner mentioned in the S203 part may alternatively be used.

In an S404 part, based on the eight sets of calibrated voltages, 72 sets of calibrated voltages corresponding to 72 wavelengths of the 80 wavelengths are obtained through calculation.

This part is a specific example of the S204 part. Refer to the description of the S204 part for details, and details are not described herein. Specifically, calculation may be performed by using an obtained set of calibrated voltages and a corresponding wavelength and by using the calculation method described in the S204 part.

A plurality sets of extreme voltages are obtained as candidate sets of calibrated voltages, and one set of voltages with smaller values is selected from the candidate sets of calibrated voltages as one set of calibrated voltages of the microring filter. In this way, the wavelength calibration technology disclosed in this embodiment effectively reduces a system power loss of the microring filter. Compared with that in the prior art, values of the set of calibrated voltages of the microring filter are comparatively small. This helps to ensure that interference during adjustment between different wavelengths is reduced, and therefore, tolerance of the microring to an environment change can be improved. In addition, some wavelengths are selected for calibration, and calibrated voltages of remaining wavelengths are obtained through calculation. This greatly increases a calibration speed and increases calibration efficiency.

Embodiment 3

This embodiment provides a wavelength calibration method, apparatus, and system. An example in which the system includes the control subsystem and a first-order microring filter shown in FIG. 1 is used. The wavelength calibration method is performed by the control subsystem, and wavelength calibration is completed by interacting with the first-order microring filter. It should be noted that, in this embodiment, an example in which the control subsystem obtains monitored optical power through a throughput port or a drop port of the microring filter is used. To be specific, an extreme value of the monitored optical power corresponds to a minimum value or a maximum value. To simplify a description, the extreme value is used in this embodiment for description.

Figure 5:
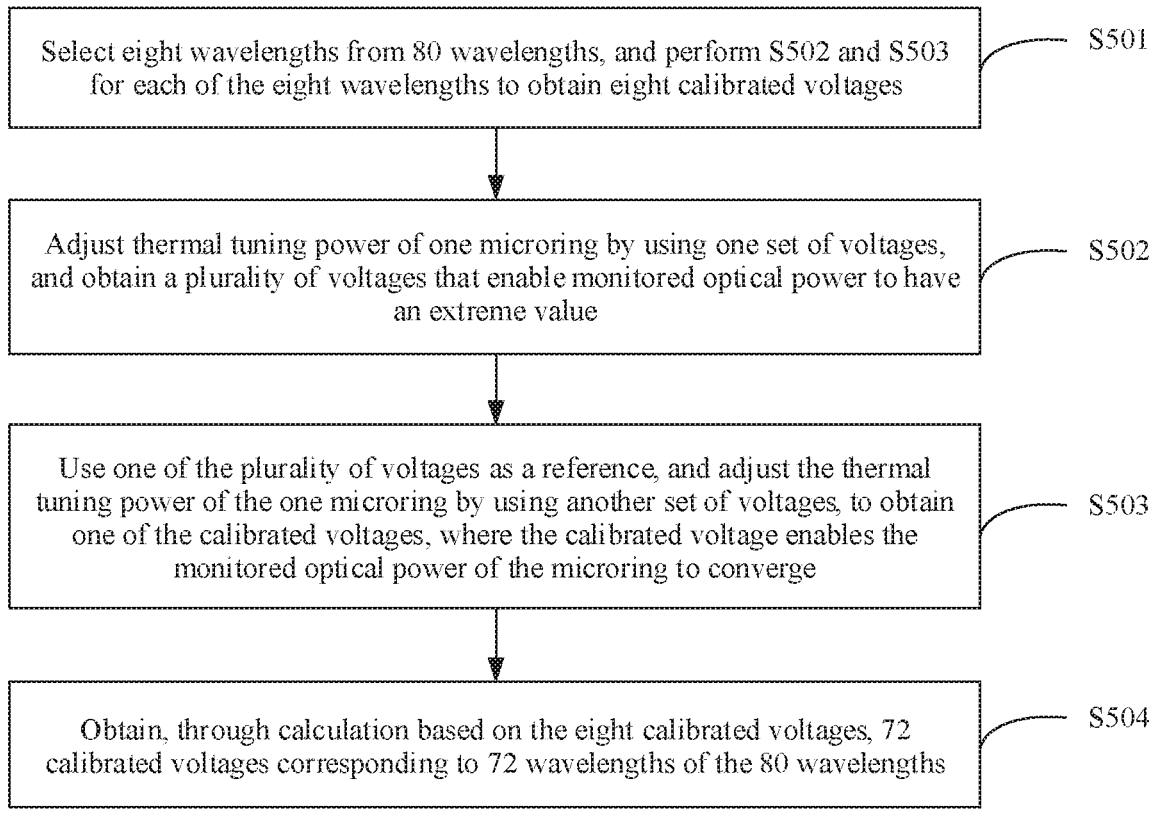
FIG. 5 is a schematic flowchart of a wavelength calibration method for a first-order microring filter according to this application.

FIG. 5 provides detailed steps, and the following steps are specifically included.

In an S501 part, eight wavelengths are selected from 80 wavelengths, and S502 and S503 are performed for each of the eight wavelengths to obtain eight calibrated voltages.

This part is a specific example of the S201 part. Refer to the description of the S201 part for details, and details are not described herein. In short, this part is used to determine one set of wavelengths on which calibrated voltages need to be obtained through commissioning. For example, if the microring filter supports $\lambda_1$, $\lambda_2$, . . . , and $\lambda_{80}$, $\lambda_1$, $\lambda_{11}$, $\lambda_{21}$, $\lambda_{31}$, $\lambda_{41}$, $\lambda_{51}$, $\lambda_{61}$, and $\lambda_{71}$ may be selected.

It should be noted that the following two steps for different wavelengths are similar. Unless otherwise specified, in a related description, an example in which an input wavelength of the microring filter is a wavelength selected in this step is used.

In an S502 part, thermal tuning power of one microring is adjusted by using one set of voltages, and a plurality of voltages that enable the monitored optical power to have an extreme value are obtained.

This part is a specific example of the S202 part. Refer to the description of the S202 part for details, and details are not described herein. The following briefly describes operations on the one microring in this step. An example in which a range of one set of voltages is 0 V to 5 V, and a step is 0.1 V, to be specific, this set of voltages is {0.1 V, 0.2 V, . . . , and 5 V}. By applying specific values of the set of voltages to microring 1 in turn, one set of voltages that enables the monitored optical power to have the extreme value may be obtained. Each set of voltages corresponds to one microring. Then, values of the set of voltages are processed to obtain a finally required voltage. For example, if an obtained set of voltages corresponding to the two microrings is {1.5 V and 2.5 V}, two voltages are finally required, and after being sorted in ascending order, the two voltages are as follows: {1.5 V} and {2.5 V}. The two voltages are to be used in a next step. It should be noted that, it may be understood that the finally required voltage may alternatively be considered as one set of voltage, and the set of voltages includes only one voltage value.

It should be noted that, if an obtained set of voltages of a microring includes many voltage values, the voltage values may be screened by using the method described in step S202, and details are not described herein.

In an S503 part, one of the plurality of voltages is used as a reference, and the thermal tuning power of the one microring is adjusted by using another set of voltages, to obtain one of the calibrated voltages, where the calibrated voltage enables the monitored optical power of the microring to converge.

This part is a specific example of the S203 part. Refer to the description of the S203 part for details, and details are not described herein. The following briefly describes a specific processing process for the one microring. First, the first voltage {1.5 V} is selected from the sorted voltages obtained in step S502. Then, voltage scanning is performed on the corresponding microring by using each voltage in the set of voltages as a reference and by using a specific voltage range and a specific step. For example, if the voltage range is ±1 V, and the step is 0.1 V, the another set of voltages is {0.5 V, 0.6 V, . . . , and 2.5 V}. The set of voltages is applied to the microring and corresponding monitored optical power is recorded. Then, it is determined whether monitored optical power obtained for the microring converges. If the monitored optical power converges, a currently used voltage is determined as a calibrated voltage. If the monitored optical power does not converge, a next voltage is selected, and same operations are performed until the calibrated voltage is finally obtained. Then, this step ends.

It should be noted that, for a specific order of selecting a voltage, another manner mentioned in the S203 part may alternatively be used.

In an S504 part, based on the eight sets of calibrated voltages, 72 sets of calibrated voltages corresponding to 72 wavelengths of the 80 wavelengths are obtained through calculation.

This part, is a specific example of the S204 part. Refer to the description of the S204 part for details, and details are not described herein. Specifically, calculation may be performed by using an obtained set of calibrated voltages and a corresponding wavelength and by using the calculation method described in the S204 part.

A plurality of extreme voltages are obtained as candidate sets of calibrated voltages, and a voltage with a smaller value is selected from the candidate sets of calibrated voltages as a calibrated voltage of the microring filter. In this way, the wavelength calibration technology disclosed in this embodiment effectively reduces a system power loss of the microring filter. Compared with that in the prior art, a value of the determined calibrated voltage is comparatively small. This helps to ensure that interference during adjustment between different wavelengths is reduced, and therefore, tolerance of the microring to an environment change can be improved. In addition, some wavelengths are selected for calibration, and calibrated voltages of remaining wavelengths are obtained through calculation. This greatly increases a calibration speed and increases calibration efficiency.

Embodiment 4

Figure 6:
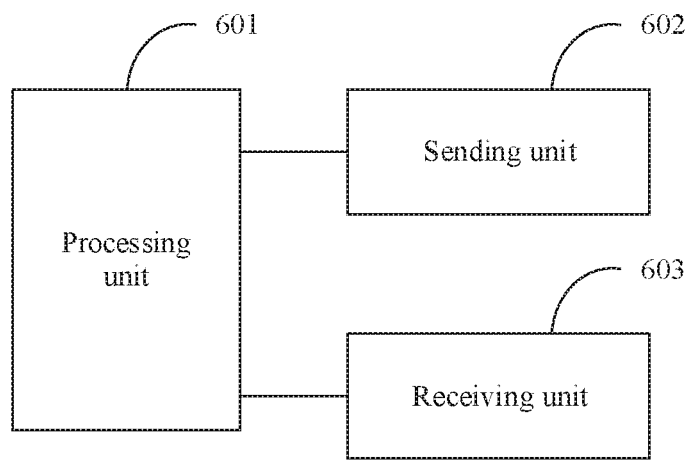
FIG. 6 is a possible structural diagram of a device according to an embodiment of this application.

FIG. 6 is a possible structural diagram of a device according to an embodiment of this application. The apparatus includes a processing unit 601, a sending unit 602, and a receiving unit 603. It should be noted that the apparatus may be configured to implement the wavelength calibration apparatus of different behaviors mentioned in the foregoing embodiments 1 to 3, and implement wavelength calibration by interacting with a microring filter. The following provides some examples. It should be further noted that there is one or more sending units. The sending unit is generally a circuit, and is configured to apply a drive voltage or a drive current to a microring of the microring filter. There may also be one or more receiving units, and the receiving unit is generally an optical receiving diode.

In a possible implementation, the apparatus is configured to implement the method shown in FIG. 2. Specifically, the processing unit 601 is configured to perform internal processing steps in FIG. 2. The sending unit 602 is configured to send control information for adjusting thermal tuning power to an optical switch. The receiving unit 603 is configured to receive monitored optical power information of the microring filter.

In another possible implementation, the apparatus is configured to implement the method shown in FIG. 3. Specifically, the processing unit 601 is configured to perform internal processing steps in FIG. 3. The sending unit 602 is configured to send control information for adjusting thermal tuning power. The receiving unit 603 is configured to receive monitored optical power information.

In another possible implementation, the apparatus is configured to implement the method shown in FIG. 4. Specifically, the processing unit 601 is configured to perform internal processing steps in FIG. 4. The sending unit 602 is configured to send control information for adjusting thermal tuning power. The receiving unit 603 is configured to receive monitored optical power information.

It should be noted that the apparatus described in FIG. 6 is the control subsystem 102 shown in FIG. 1, and a control and interaction object of the apparatus is a microring filter. For components that may further be included in the apparatus and a specific related description, refer to the description for the control subsystem in FIG. 1. Details are not described herein. It should be further noted that, the processing unit, the sending unit, and the receiving unit described above may alternatively be replaced with a processor, a transmitter, and a receiver.

A person of ordinary skill in the art may understand that all or some of the steps of the embodiments may be implemented by hardware or a program instructing related hardware. The program may be stored in a computer-readable storage medium. The storage medium mentioned above may include a read-only memory, a random access memory, or the like. Specifically, for example, the foregoing processing unit or processor may be a central processing unit, a general-purpose processor, a digital signal processor (DSP), an application specific integrated circuit (ASIC), a field programmable gate array (FPGA) or another programmable logical device, a transistor logical device, a hardware component, or any combination thereof. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When software is used to implement the embodiments, the method steps in the foregoing embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, another computer, another server, or another data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wavelength calibration method for a microring filter, and the method comprises:
   selecting N wavelengths from M wavelengths, and performing operations A1 and A2 on the microring filter for each of the N wavelengths, thereby obtaining N sets of calibrated voltages, the microring filter comprises a plurality of microrings, wherein N is less than M;
   wherein the operations A1 include: adjusting thermal tuning power of the plurality of microrings in response to one set of voltages, and obtaining a plurality of sets of voltages that enable monitored optical power to exceed a first threshold and less than a second threshold; and
   wherein the operations A2 include: using the plurality of sets of voltages as a reference, adjusting the thermal tuning power of the plurality of microrings in response to another set of voltages, and determining one of the N sets of calibrated voltages from the plurality of sets of voltages, wherein the N sets of calibrated voltages enables the monitored optical power to converge, and the monitored optical power is not less than a preset value in response to the monitored optical power having a maximum value, or the monitored optical power is not greater than another preset value in response to the monitored optical power having a minimum value; and
   obtaining, based on the N sets of calibrated voltages, M−N sets of calibrated voltages corresponding to M−N wavelengths of the M wavelengths.

2. The method according to claim 1, wherein the adjusting thermal tuning power of the plurality of microrings in response to the one set of voltages, and obtaining the plurality of sets of voltages that enable monitored optical power to exceed the first threshold and less than the second threshold comprises:
   adjusting the thermal tuning power of the plurality of microrings in response to the one set of voltages, and obtaining a plurality of sets of other voltages that enable the monitored optical power to exceed the first threshold and less than the second threshold, wherein each of the plurality of sets of other voltages corresponds to one of the plurality of microrings; and
   determining the plurality of sets of voltages based on the plurality of sets of other voltages, wherein each of the plurality of sets of voltages is determined by including one voltage value from each of the plurality of sets of other voltages for combination.

3. The method according to claim 2, wherein the obtaining the plurality of sets of other voltages that enable the monitored optical power to exceed the first threshold and less than the second threshold comprises performing low-pass filtering processing on obtained voltages and a monitored optical power data.

4. The method according to claim 1, wherein a voltage adjustment range in the operations A1 is greater than a voltage adjustment range in the operations A2.

5. The method according to claim 1, wherein the N wavelengths are evenly distributed in the M wavelengths.

6. The method according to claim 1, wherein the monitored optical power has an extreme value that is a maximum value of the monitored optical power or a minimum value of the monitored optical power.

7. The method according to claim 1, wherein the method further comprises: after the operations A1 and before the operations A2, sorting the plurality of sets of voltages in ascending order of values.

8. The method according to claim 1, wherein N/M is less than or equal to 0.2.

9. The method according to claim 1, wherein the obtaining, based on the N sets of calibrated voltages, M−N sets of calibrated voltages corresponding to M−N wavelengths of the M wavelengths comprises:
   calculating, based on the N sets of calibrated voltages, M−N sets of calibrated voltage values according to the following equation:

$$\lambda_2 - \lambda_1 = \frac{\eta(U_2^2 - U_1^2)}{2\pi R \cdot R_m} \cdot \frac{\lambda_m}{n_g},$$

where
$\lambda_2-\lambda_1$ represents a difference between two wavelengths, $$\frac{(U_2^2 - U_1^2)}{R_m}$$

represents a difference between detected optical powers corresponding to the two wavelengths, $\eta$ represents a thermo-optical tuning value, R represents a radius of a microring, $R_m$ represents a resistance value of the microring, $\lambda_m$ represents value of a wavelength with a known set of calibrated voltages in the two wavelengths, and $n_g$ represents a refractive index.

10. An apparatus, configured for wavelength calibration for a microring filter, and comprising:
   a processor,
   an optical power detector, and
   a driver, wherein
      the optical power detector is configured to obtain monitored optical power of the microring filter and provide the monitored optical power to the processor;

the driver is configured to apply a drive voltage specified by the processor to a plurality of microrings of the microring filter; and the processor is configured to:
select N wavelengths from M wavelengths, and perform operations A1 and A2 on the microring filter for each of the N wavelengths, thereby obtaining N sets of calibrated voltages, wherein N is less than M;

wherein the operations A1 include: adjusting thermal tuning power of the plurality of microrings in response to one set of voltages, and obtaining a plurality of sets of voltages that enable the monitored optical power to exceed a first threshold and less than a second threshold; and wherein the operations A2 include: using the plurality of sets of voltages as a reference, adjusting the thermal tuning power of the plurality of microrings in response to another set of voltages, and determining one of the N sets of calibrated voltages from the plurality of sets of voltages, wherein the N sets of calibrated voltages enables the monitored optical power to converge, and the monitored optical power is not less than a preset value in response to the monitored optical power having a maximum value, or the monitored optical power is not greater than another preset value in response to the monitored optical power having a minimum value; and obtain, based on the N sets of calibrated voltages, M–N sets of calibrated voltages corresponding to M–N wavelengths of the M wavelengths.

11. The apparatus according to claim 10, wherein the adjusting thermal tuning power of the plurality of microrings in response to the one set of voltages, and obtaining the plurality of sets of voltages that enable the monitored optical power to exceed the first threshold and less than the second threshold comprises:

adjusting the thermal tuning power of the plurality of microrings in response to the one set of voltages, and obtaining a plurality of sets of other voltages that enable the monitored optical power to exceed the first threshold and less than the second threshold, wherein each of the plurality of sets of other voltages corresponds to one of the plurality of microrings; and determining the plurality of sets of voltages based on the plurality of sets of other voltages, wherein each of the plurality of sets of voltages is determined by including one voltage value from each of the plurality of sets of other voltages for combination.

12. The apparatus according to claim 11, wherein the obtaining the plurality of sets of other voltages that enable the monitored optical power to exceed the first threshold and less than the second threshold comprises performing low-pass filtering processing on obtained voltages and a monitored power data pair.

13. The apparatus according to claim 10, wherein a voltage adjustment range in the operations A1 is greater than a voltage adjustment range in the operations A2.

14. The apparatus according to claim 10, wherein the N wavelengths are evenly distributed in the M wavelengths.

15. The apparatus according to claim 10, wherein the monitored optical power has an extreme value that is a maximum value of the monitored optical power or a minimum value of the monitored optical power.

16. The apparatus according to claim 10, wherein the processor is further configured to sort the plurality of sets of voltages in ascending order.

17. The apparatus according to claim 10, wherein N/M is less than or equal to 0.2.

18. The apparatus according to claim 10, wherein the obtaining, based on the N sets of calibrated voltages, M–N sets of calibrated voltages corresponding to M–N wavelengths of the M wavelengths comprises:

calculating, based on the N sets of calibrated voltages, M–N calibrated voltage values according to the following equation:

$$\lambda_2 - \lambda_1 = \frac{\eta(U_2^2 - U_1^2)}{2\pi R \cdot R_m} \cdot \frac{\lambda_m}{n_g},$$

where
$\lambda_2-\lambda_1$ represents a difference between two wavelengths, $$\frac{(U_2^2 - U_1^2)}{R_m}$$

represents a difference between detected optical powers corresponding to the two wavelengths, $\eta$ represents a thermo-optical tuning value, R represents a radius of a microring, $R_m$ represents a resistance value of the microring, $\lambda_m$ represents value of a wavelength with a known calibrated voltage set in the two wavelengths, and $n_g$ represents a refractive index.

19. The apparatus according to claim 12, wherein a voltage adjustment range in the operations A1 is greater than a voltage adjustment range in the operations A2.

20. The apparatus according to claim 12, wherein the obtaining, based on the N sets of calibrated voltages, M–N sets of calibrated voltages corresponding to M–N wavelengths of the M wavelengths comprises:

calculating, based on the N sets of calibrated voltages, M–N calibrated voltage values according to the following equation:

$$\lambda_2 - \lambda_1 = \frac{\eta(U_2^2 - U_1^2)}{2\pi R \cdot R_m} \cdot \frac{\lambda_m}{n_g},$$

where
$\lambda_2-\lambda_1$ represents a difference between two wavelengths $$\frac{(U_2^2 - U_1^2)}{R_m}$$

represents a difference between detected optical powers corresponding to the two wavelengths, $\eta$ represents a thermo-optical tuning value, R represents a radius of a microring, $R_m$ represents a resistance value of the microring, $\lambda_m$ represents value of a wavelength with a known calibrated voltage set in the two wavelengths, and $n_g$ represents a refractive index.

* * * * *